(12) United States Patent
Cheon et al.

(10) Patent No.: US 12,452,039 B2
(45) Date of Patent: Oct. 21, 2025

(54) ELECTRONIC DEVICE FOR ENCRYPTING DATA BY PUBLIC KEY AND METHODS THEREOF

(71) Applicant: CRYPTO LAB INC., Seoul (KR)

(72) Inventors: Jung Hee Cheon, Seoul (KR); Hyeongmin Choe, Seoul (KR); Dongyeon Hong, Seoul (KR)

(73) Assignee: CRYPTO LAB INC., Seoul (KR)

( * ) Notice: Subject to any disclaimer, the term of this patent is extended or adjusted under 35 U.S.C. 154(b) by 208 days.

(21) Appl. No.: 18/522,648

(22) Filed: Nov. 29, 2023

(65) Prior Publication Data

US 2024/0178992 A1    May 30, 2024

(30) Foreign Application Priority Data

Nov. 30, 2022   (KR) .......... 10-2022-0164724
Nov. 28, 2023   (KR) .......... 10-2023-0168643

(51) Int. Cl.
  *H04L 9/08*    (2006.01)

(52) U.S. Cl.
  CPC .......... *H04L 9/0825* (2013.01); *H04L 9/0869* (2013.01)

(58) Field of Classification Search
  CPC ..... H04L 9/0825; H04L 9/0869; H04L 9/008; H04L 9/3093; H04L 9/08
  See application file for complete search history.

(56) References Cited

U.S. PATENT DOCUMENTS

| | | | |
|---|---|---|---|
| 2015/0188703 A1* | 7/2015 | Yu .......................... | H04L 9/0891 380/46 |
| 2022/0353089 A1* | 11/2022 | Masny .................. | H04L 9/3247 |

* cited by examiner

*Primary Examiner* — Quazi Farooqui
(74) *Attorney, Agent, or Firm* — Steinfl + Bruno LLP (57) ABSTRACT

Disclosed is an electronic device. The electronic device includes a communicator, a memory configured to store data for generating a key, and a processor. The processor may generate a secret key by randomly combining values within a preset range based on the data stored in the memory, generate a public key using the secret key and an error, and store the secret key and the public key in the memory, transmit the public key to an external device using the communicator, and a sum of the number of remaining values other than zero (0), among the values within the preset range, may correspond to a Hamming weight. Accordingly, encryption and decryption may be performed efficiently.

14 Claims, 9 Drawing Sheets

```
HWT_h(seed):                                    ▷ seed ∈ {0, 1}^256
1: idx = 0
2: (buf, rand) ← XOF(seed)
3: for i from n - h to n - 1 do
4:   degree = ⌊(buf[idx] · (i + 1))/2^32⌋      ▷ buf[idx] ∈ {0, 1}^32
5:   res[i] = res[degree]
6:   res[degree] = (-1)^rand[idx]               ▷ rand[idx] ∈ {0, 1}
7:   idx = idx + 1
8: return convToIdx(res)                        ▷ Storing the indexes
```

FIG. 7

```
dGaussian_{1.0625}(x):
Require: x = x0x1x2x3x4x5x6x7x8x9 ∈ {0, 1}^10
 1:  s = s_1s_0 = 00 ∈ {0, 1}^2
 2:  s_0 = x_0x_1x_2x_3x_4x_5x_7\overline{x_8}
 3:  s_0 += (x_0x_3x_4x_5x_8) + (x_1x_3x_4x_5x_6x_8) + (x_2x_3x_4x_5x_6x_8)
 4:  s_0 += (\overline{x_2x_3x_6}x_8) + (\overline{x_1x_3x_6}x_8)
 5:  s_0 += (x_6x_7\overline{x_8}) + (\overline{x_5x_6}x_8) + (\overline{x_4x_6}x_8) + (\overline{x_7}x_8)
 6:  s_1 = (x_1x_2x_4x_5x_7x_8) + (x_3x_4x_5x_7x_8) + (x_6x_7x_8)
 7:  s = (-1)^{x9} · s              ▷ · is the arithmetic multiplication
 8:  return s
```

FIG. 8

```
dGaussian_{1.453713}(x):
Require: x = x_0x_1x_2x_3x_4x_5x_6x_7x_8x_9x_10 ∈ {0, 1}^11
 1:  s = s_2s_1s_0 = 000 ∈ {0, 1}^3
 2:  s_0 = (x_0x_1x_2x_3x_5x_7x_8) + (x_1x_2x_3x_5x̄_6x_7x_9) + (x̄_1x_2x_3x_6x_7x_8)
 3:  s_0 += (x̄_1x_2x_3x_5x_8x_9) + (x̄_0x_2x_3x_5x_8x_9)
 4:  s_0 += (x_4x_5x̄_6x_7x_9) + (x_3x_4x_8x̄_9) + (x̄_5x_6x_7x_8) + (x̄_4x_6x_7x_8) + (x̄_4x̄_5x_8x_9)
 5:  s_0 += (x_5x_8x̄_9) + (x_6x_8x̄_9) + (x_7x_8x̄_9) + (x̄_7x_8x_9) + (x̄_6x_8x_9)
 6:  s_1 = (x_0x_1x_4x̄_5x_6x_7x_9) + (x_2x_4x̄_5x_6x_7x_9) + (x_3x_4x̄_5x_6x_7x_9) + (x_5x_6x_7x̄_8x_9)
 7:  s_1 += (x̄_1x_2x_3x_8x_9) + (x̄_7x_8x_9) + (x̄_6x_8x_9) + (x̄_5x_8x_9) + (x̄_4x_8x_9)
 8:  s_2 = (x_1x_4x_5x_6x_7x_8x_9) + (x_2x_4x_5x_6x_7x_8x_9) + (x_3x_4x_5x_6x_7x_8x_9)
 9:  s = (-1)^{x_10} · s               ▷ · is the arithmetic multiplication
10:  return s
```

FIG. 9

| Schemes | Sizes(bytes) | | | Security | | Cycle(ratio) | | |
|---|---|---|---|---|---|---|---|---|
| | sk | pk | ct | Classic. | DFP | KeyGen | Encap | Decap |
| NIST's security level 1 (120) | | | | | | | | |
| first Scheme | 1632 | 800 | 768 | 118 | $2^{-139}$ | 1.70 | 2.10 | 2.03 |
| second Scheme | 832 | 672 | 736 | 118 | $2^{-120}$ | 1.21 | 1.58 | 1.44 |
| third Scheme | 800 | 608 | 672 | 114 | $2^{-139}$ | 1.10 | 1.48 | 1.39 |
| fourth Scheme | 176 | 672 | 672 | 120 | $2^{-120}$ | 1 | 1 | 1 |

ELECTRONIC DEVICE FOR ENCRYPTING DATA BY PUBLIC KEY AND METHODS THEREOF

BACKGROUND

1. Field

The disclosure relates to an electronic device for encrypting data by a public key and a method thereof and, more particularly to, an electronic device for generating a public key using an error and performing encryption using the public key, and a method thereof.

2. Description of Related Art

When transmitting data to an external device, there is a possibility of leakage of the corresponding data to a third party during transmission. Therefore, it is general to encrypt data and transmit the encrypted data so that even if the data is leaked the third party may not identify the contents of the data.

An encryption method is broadly divided into a symmetric key encryption method and an asymmetric key encryption method. In the symmetric key encryption method, a key used for encryption and a key used for decryption are the same and thus speed of the method is fast, but when the key is leaked to the outside, the security may not be guaranteed. In order to address the problem, the asymmetric key encryption method is used. In the asymmetric key encryption method, a public key disclosed to a third party and a secret key (or a private key) owned only by the user are used. The user encrypts a message using the public key and transmits the message and a receiver receiving this message decrypts a ciphertext using own secret key.

In the related art, various encryption/decryption technologies have been studied and used. However, the related-art algorithms give a lot of operation burden to a processor and a memory in order to improve security performance. Therefore, there has been a difficulty in using the related-art encryption/decryption technology for a small-sized portable device like a smartphone, a tablet personal computer (PC), a wearable device, or the like.

Accordingly, there emerges a necessity for more efficient encryption/decryption technology.

SUMMARY

The disclosure is devised to address the problems described above, and provides an electronic device that may have high security performance and may perform encryption/decryption efficiently and methods thereof.

An electronic device according to at least one embodiment to achieve the aforementioned objective includes a communicator, a memory configured to store data for generating a key, and a processor. The processor may generate a secret key by randomly combining values within a preset range based on the data stored in the memory, generate a public key using the secret key and an error, and store the secret key and the public key in the memory, transmit the public key to an external device using the communicator, and a sum of the number of remaining values other than zero (0), among the values within the preset range, may correspond to a Hamming weight.

The processor may obtain a random matrix (A) composed of randomly decided vectors, obtain the error from discrete Gaussian distribution or a distribution within a short statistical distance to the discrete Gaussian distribution, obtain a random vector (b) based on a value obtained through modular operation of the error, the secret key, and the random matrix, and the public key may include the random matrix (A), a seed used for obtaining the random matrix (A), and the random vector (b).

Alternatively, the processor may obtain a first seed, a second seed, and a third seed by applying an extendable-output function (XOF) for the seed, among the data stored in the memory, obtain the random matrix (A) by applying a random matrix sampler function to the first seed, obtain the secret key s, which is a sparse vector having a Hamming weight h, by applying the Hamming weight sampler function to the second seed, and obtain an error e having standard deviation $\sigma$ by applying a discrete Gaussian sampler function to the third seed.

Alternatively, based on receiving, from the external device through the communicator, a ciphertext comprising a first value (c1) obtained by rounding a result value of operation based on a random vector r that randomly extracts values within a preset range and a random matrix A, and a second value (c2) obtained by rounding a result value of operation based on the random vector b and the random vector r, the processor may decrypt a message by, after performing modulus operation for each of the first value, the result value of operating of the secret key, and the second value, performing addition.

An electronic device according to at least one embodiment includes a communicator, an interface configured to receive data to be transmitted to an external device, a memory configured to store the data, and a processor, and the processor may, based on receiving information about a public key generated by an external device using an error through the communicator, obtain a random vector r that randomly extracts values within a preset range, obtain a random matrix A and a random vector b from the public key, obtain a first value (c1) obtained by rounding a result value of operation based on the random matrix A, and a second value (c2) obtained by rounding a result value of operation based on the random vector b, the random vector r, and the data, respectively, and transmit a ciphertext comprising the first value and the second value to the external device through the communicator.

The processor may, based on the public key comprising the random matrix A, extract the random matrix A, and based on the public key including a seed, obtain the random matrix (A) by applying a random matrix sampler function to the seed.

The processor may obtain the random vector r by applying a Hamming weight sampler function to the seed stored in the memory.

According to at least one embodiment of the disclosure, a control method of an electronic device includes generating a secret key by randomly combining values within a preset range based on pre-stored data, generating a public key using the secret key and an error, storing the secret key and the public key, and transmitting the public key to an external device, and wherein a sum of the number of remaining values other than zero (0), among the values within the preset range, corresponds to a Hamming weight.

The generating the public key may include obtaining a random matrix (A) composed of randomly decided vectors, obtaining the error from discrete Gaussian distribution or a distribution within a short statistical distance to the discrete Gaussian distribution, obtaining a random vector (b) based on a value obtained through modular operation of the error, the secret key, and the random matrix, and the random matrix (A), a seed used for obtaining the random matrix (A), and the random vector (b) are included.

The generating the public key may include obtaining a first seed, a second seed, and a third seed by applying an extendable-output function (XOF) for the pre-stored seed, obtaining the random matrix (A) by applying a random matrix sampler function to the first seed, obtaining an error e having standard deviation o by applying a discrete Gaussian sampler function to the third seed. The generating the secret key may include obtaining the secret key s, which is a sparse vector having a Hamming weight h, by applying the Hamming weight sampler function to the second seed.

Alternatively, the method may further include, based on receiving, from the external device, a ciphertext comprising a first value (c1) obtained by rounding a result value of operation based on a random vector r that randomly extracts values within a preset range and a random matrix A, and a second value (c2) obtained by rounding a result value of operation based on the random vector b and the random vector r, after performing modulus operation for each of the first value, the result value of operating of the secret key, and the second value, performing addition and decrypting a message.

In the meantime, an encryption method of an electronic device according to at least one embodiment of the disclosure includes receiving information about a public key generated by an external device using an error and storing the information, obtaining a random vector r that randomly extracts values within a preset range, obtaining a random matrix A and a random vector b from the public key, obtaining a first value (c1) obtained by rounding a result value of operation based on the random matrix A, and a second value (c2) obtained by rounding a result value of operation based on the random vector b, the random vector r, and the data, respectively, and transmitting a ciphertext comprising the first value and the second value to the external device.

Here, the obtaining a random matrix A and a random vector b from the public key may include, based on the public key comprising the random matrix A, extracting the random matrix A and based on the public key comprising a seed, obtaining the random matrix (A) by applying a random matrix sampler function to the seed.

The obtaining the random vector r may include obtaining the random vector r by applying a Hamming weight sampler function to the pre-stored seed.

According to various embodiments of the disclosure, generating the public key, encryption, and decryption may be efficiently performed.

DETAILED DESCRIPTION

Hereinafter, the disclosure will be described in detail with reference to the accompanying drawings. Encryption/decryption may be applied to an information (data) transmission process performed in the disclosure, and expressions for describing the information (data) transmission process in the disclosure and claims should all be construed to include the case of encrypting/decrypting although not mentioned separately. Expression in the form of "transmission (transfer) from A to B" or "reception by A from B" includes transmission (transfer) or reception by an intermediate medium and does not necessarily limited to only directly transmission (transfer) or reception from A to B. In the description of the disclosure, the order of each step should be understood nonrestrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non-exclusive sense to include any other component.

In this specification, the term "value" is defined as a concept including not only a scalar value but also a vector.

The mathematical calculation and computation of each step of the disclosure described hereinafter may be realized by a computer calculation by a coding method known for corresponding operation or calculation and/or coding devised suitably for the disclosure.

Specific formulas described hereinafter are exemplarily described among various possible alternatives, and the scope of the disclosure should not be construed as being limited to the formulas mentioned in the disclosure.

For convenience of description, the following is assumed.
English bold type upper case letters: matrix
English bold type lower case letters: column vector
a←D: Select element (a) according to distribution (D)
Ring $R=Z(x)/(f(x))$: calculate the remainder after dividing by f(x) after the polynomial operation on integer
⌊ ⌉: round off internal value
∥: concatenation; concatenate column vectors or matrices with the same number of rows side-by-side to calculate a new vector or matrix $HWT_n(h)$: the distribution where vectors are sampled equally from $\{0, \pm 1\}^n$ for $0 \le h \le n$, where h is the number of non-zero elements Hereinafter, various examples of the disclosure will be described in detail with reference to the accompanying drawings.

Figure 1:
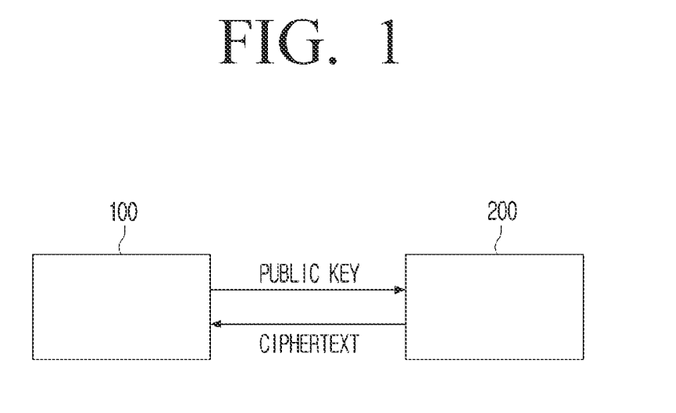
FIG. 1 is a diagram illustrating an operation of electronic devices according to at least one embodiment of the disclosure.

FIG. 1 is a diagram illustrating an operation of electronic devices according to at least one embodiment of the disclosure.

FIG. 1 illustrates an example in which a first electronic device 100, which is one of two electronic devices 100, 200, transmits a public key, and a second electronic device 200, which is another one, generates a ciphertext using the public key, and then transmits the ciphertext to the first electronic device 100. Here, the expressions "first" and "second" are arbitrarily added for convenience of description, and the first and second electronic devices 100, 200 may be implemented as same types of electronic devices or different types of electronic devices. For example, each of the first and second electronic devices 100, 200 may be implemented as various devices such as a personal computer (PC), a laptop PC, a server device, a smartphone, a tablet PC, a kiosk, a home appliance, or the like. Therefore, the electronic device may be diversely named as a user terminal device, a computing device, a data processing device, and the like.

The first electronic device 100 generates a key to be used for encryption using an error. The key includes a public key and a secret key. Specifically, a secret key is randomly set, and a public key is generated using the secret key, a random value, and an error. The public key is used for encryption and the secret key may be used to decrypt the encrypted message. When a public key is generated using an error that is an unknown value, even if a third party obtains a message and analyzes the message iteratively, it is difficult to identify the secret key. Therefore, security may be further improved.

The first electronic device 100 transmits the generated public key to the second electronic device 200. The second electronic device 200 receives and stores the public key. The public key may include a matrix and a vector, or a seed and a vector for generating a matrix.

When there is data to be transmitted to the first electronic device 100, the second electronic device 200 encrypts the corresponding data using the public key transmitted by the first electronic device 100. The second electronic device 200 may generate ciphertext by an encryption method including a rounding processing. This will be described in detail below.

The second electronic device 200 transmits the generated ciphertext to the first electronic device 100. When the ciphertext is received, the first electronic device 100 may secure data by decrypting the ciphertext using a previously generated and stored secret key.

Referring to FIG. 1, the public key generation method performed by the first electronic device 100 may be Module-Learning with Errors (MLWE), and the encryption performed by the first electronic device 200 may be Module-Learning with Rounding (MLWR). When using the MLWE, the MLWE enables us to fine-tune security and efficiency in a much more scalable way as compared to the related-art method. Particularly, by combining MLWE and MLWR, efficiency of encryption and decryption may be significantly improved.

Figure 2:
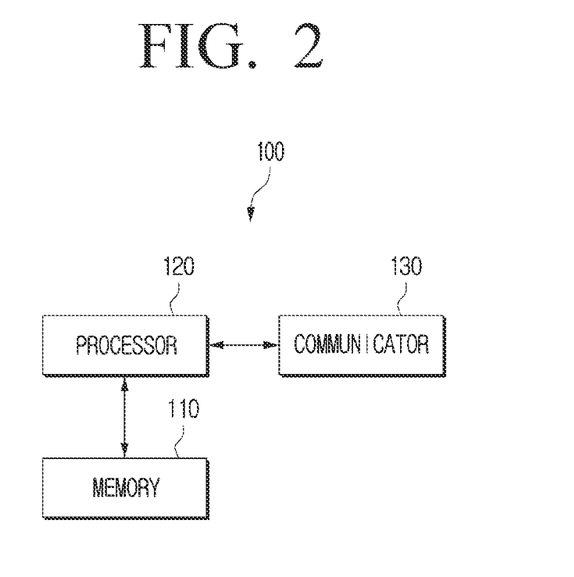
FIG. 2 is a block diagram illustrating a configuration of an electronic device for generating a public key according to at least one embodiment of the disclosure.

FIG. 2 illustrates a configuration of the electronic device 100 according to at least one embodiment of the disclosure. The electronic device 100 of FIG. 2 may be the first electronic device of FIG. 1.

Referring to FIG. 2, the electronic device 100 includes a memory 110, a processor 120, and a communicator 130.

The memory 110 includes various programs, instructions, and data necessary for the operation of the electronic device 100. In FIG. 2, the memory 110 is illustrated as being separate from the processor 120, but is not necessarily limited thereto, and the memory 110 may be implemented as an internal memory such as a ROM (for example, an electrically erasable programmable read-only memory (EEPROM)) or a RAM included in the processor 120.

Alternatively, the memory 110 may be implemented as a memory embedded in the electronic device 100, or may be implemented as a detachable memory in the electronic device 100, according, for example, to the data usage purpose. To be specific, the memory 110 may be implemented as a volatile memory such as a static random access memory (SRAM), a synchronous dynamic random access memory (SDRAM), or a nonvolatile memory such as one time programmable ROM (OTPROM), programmable ROM (PROM), erasable and programmable ROM (EPROM), electrically erasable and programmable ROM (EEPROM), mask ROM, flash ROM, a flash memory, a hard disk drive or a solid state drive (SSD), a compact flash (CF), secure digital (SD), micro secure digital (micro-SD), mini secure digital (mini-SD), extreme digital (xD), multi-media card (MMC), etc.

In the disclosure, the term memory 110 may include the storage, read-only memory (ROM) (not shown) in the processor 120, random access memory (RAM) (not shown), or a memory card (not shown) (for example, a micro secure digital (SD) card, and a memory stick) mounted to the electronic device 100. Referring to FIG. 1, the memory 110 is illustrated as one, but the memory 110 may be implemented with diverse numbers.

The memory 110 is accessed by the processor 120. In the memory 110, reading/writing/modifying/deleting/updating of data by the processor 120 may be performed.

To be specific, the memory 110 may store information about various seeds for generating a key, information about a random value, various functions, or the like. When a secret key, a public key, or the like, is generated by the processor 120, the processor 120 may store the information about the secret key and the public key in the memory 110.

The processor 120 is configured to control overall of the electronic device 100. The processor 120 may be implemented with, for example, and without limitation, a digital signal processor (DSP) for processing a digital signal, a microprocessor, a central processor (CPU), a micro controller unit (MCU), a micro processor (MPU), a controller, an application processor (AP), a graphics-processing unit (GPU), communication processor (CP), an advanced reduced instruction set computing (RISC) machine (ARM) processor, or may be defined as a corresponding term. The processor 120 may be implemented in a system on chip (SoC) type or a large scale integration (LSI) type that a processing algorithm is built therein, or in a field programmable gate array (FPGA) type. In addition, the processor 120 may perform various functions by executing computer executable instructions stored in the memory 110.

The processor 120 may generate various keys to be used for encryption. To be specific, the processor 120 may generate a secret key and a public key. The processor 120 may store the generated secret key and the public key in the memory 110.

The processor 120 may perform various operations using the stored key.

For example, the processor 120 may transmit a public key to various external devices such as the second electronic device 200 of FIG. 1 through the communicator 130. The second electronic device 200 may generate a ciphertext using the transmitted public key and transmit the ciphertext to the electronic device 100 again. When a ciphertext is received through the communicator 130, the processor 120 may decrypt the ciphertext using the secret key stored in the memory 110, and may extract data, that is, a message within the ciphertext.

Alternatively, the processor 120 may directly receive a message to be transmitted to an external device through the communicator 130 or other interfaces (not shown). The interface may include a connection port connectable to various external devices such as a keyboard, a mouse, a joystick, a microphone, a camera, a universal serial bus (USB) memory, an electronic device, or the like. Alternatively, the interface may include a touch screen, a button, a touch pad, and the like, which may be directly touched by a user. When a message to be transmitted to an external device is inputted to the electronic device 100, the processor 120 encrypts the message using a public key, and then transmits the ciphertext to an external device. The external device may not have a secret key and thus, even if the external device receives the ciphertext, the external device may not identify a message included in the ciphertext. When a result value obtained by performing an arbitrary operation with respect to the ciphertext by the external device is received through the communicator 130, the processor 120 may apply a secret key and decrypt a result value. Accordingly, an operation result value for the original message may be identified.

Alternatively, the processor 120 may transmit a secret key to an external device. Thereafter, whenever data to be transmitted to the external device is generated, the processor 120 may encrypt the data using the public key and then transmit the data to the external device. The external device may utilize the data by decrypting the ciphertext using the previously received secret key.

As described above, the processor 120 of the electronic device 100 may utilize the public key and the secret key in a diverse way.

Generation of the public key and the secret key may be performed according to various embodiments.

For example, the processor 120 may generate the public key and the secret key used for encryption using an error.

The processor 120 may use various data stored in the memory 110 to generate a secret key. The processor 120 randomly combines values within a predetermined range based on the data stored in the memory 110 and generate a secret key. For example, the processor 120 may generate the secret key by randomly combining the predetermined numbers such as −1, 0, 1. The processor 120 stores the generated secret key in the memory 110.

Alternatively, the processor 120 may obtain a random matrix (A) composed of vectors randomly decided.

The processor 120 may, after obtaining an error from discrete Gaussian distribution or distribution within a short statistical distance to the discrete Gaussian distribution, obtain a random vector (b) based on a value obtained through modular operation of an error, the secret key, and the random matrix.

The processor 120 may generate the public key including the random matrix (A) and the random vector (b). The processor 120 stores the generated public key in the memory 110.

The processor 120 may use a seed for obtaining a random matrix, error, and secret key. To be specific, the processor 120 may obtain a first seed, a second seed, and a third seed by applying an extendable-output function (XOF) for the seed, among the data stored in the memory 110. The XOF function is an example of the hash function capable of calculating hash values in the variable length.

The processor 120 may obtain a random matrix (A) by applying a random matrix sampler function to a first seed among the obtained seeds. In addition, the processor 120 may, by applying the discrete Gaussian sampler function to the second seed, obtain the error e having the standard deviation σ, and may obtain the secret key s, which is a sparse vector having a Hamming weight h, by applying the Hamming weight sampler function to the third seed.

The operation of each step of the processor 120 may be expressed in the equation as shown below.

$$\text{seed} \leftarrow \{0,1\}^{256} \qquad \qquad 1:$$

$$(\text{seed}_A, \text{seed}_{sk}, \text{seed}_e) \leftarrow \text{XOF}(\text{seed}) \qquad \qquad 2:$$

$$A \leftarrow \text{expand}A(\text{seed}_A) \in \mathcal{R}_q^{k \times k} \qquad \qquad 3:$$

$$s \leftarrow \text{HWT}_{hs}(\text{seed}_{sk}) \in S_n^k \qquad \qquad 4:$$

$$e \leftarrow d\text{Gaussian}_\sigma(\text{seed}_e) \in \mathcal{R}^k \qquad \qquad 5:$$

$$b = -A^T \cdot s + e \in \mathcal{R}_q^k \qquad \qquad 6:$$

$$pk = (\text{seed}_A, b), sk = s \qquad \qquad 7:$$

Hereinabove, the order of the first to the seventh steps is arbitrarily determined, and an order of some steps may be changed, and some steps may be proceeded in parallel.

The processor 120 may extract a seed from among data sets composed of a combination of 0 or 1. The processor 120 extracts first, second, and third seeds ($\text{seed}_A$, $\text{seed}_{sk}$, $\text{seed}_e$) using the extracted seed as an input value of the XOF function. Such processing of the XOF function may be referred to as hash function processing. In addition, the embodiment is not necessarily limited to XOF, and various other hash function processing technologies may also be used. In addition, the aforementioned first, second, and third seeds ($\text{seed}_A$, $\text{seed}_{sk}$, $\text{seed}_e$) may be referred to as bit sequence to be distinguished from the seed mentioned above.

The processor 120 obtains the matrix A using the first seed $\text{seed}_A$ as the input value of the expandA function, which is the uniform random matrix sampler function. The matrix A may be a random matrix where the number of rows and columns are k, respectively, and belongs to the matrix $\mathcal{R}_q^{k \times k}$ in which coefficient of each matrix element is composed of $n^{th}$ polynomial where the coefficient is modulus q.

Here, R denotes a ring, and a ring refers to a set of polynomials having a predetermined coefficient, an addition and multiplication are defined between elements, and a set is closed for addition and multiplication. The above-described $\mathcal{R}_q^{k \times k}$ may have a lattice structure in MLWE and MLWR. Here, the lattice structure may be a Euclidean lattice structure.

The processor 120 obtains a secret key s using a second seed $\text{seed}_{sk}$ as an input value of a Hamming weight sampler function $\text{HWT}_{hs}$. The secret key s may be a vector of length k consisting of a polynomial having a coefficient of −1, 0, 1. The value obtained by adding a non-zero value, that is, the number of −1 and 1 among the coefficients of the polynomial constituting the secret key s, may be a Hamming weight h. The secret key may be a sparse vector. When an error is used to generate a public key, if the size of an error is too large, there is a difficulty in encryption and decryption processing, and thus the size of an error may be limited by applying a Hamming weight. The Hamming weight H may be set within various ranges. For example, the Hamming weight h may be set to an arbitrary value (e.g., 190) within a range from 150 to 300.

The processor 120 may obtain an error e having the standard deviation σ by applying the discrete Gaussian sampler function to the third seed. The error e may be calculated from the discrete Gaussian distribution or distribution that is within a short statistical distance to the discrete Gaussian. The discrete Gaussian sampler function for obtaining the error e is composed of various bit operators and may be implemented with a constant time algorithm with a constant running time regardless of the output. The standard deviation σ of the error e may be set to various values. For example, σ may be set to an arbitrary value within a range of 0.5 to 2, but is not limited thereto.

If the random matrix (A), a secret key (s), and an error (e) are obtained, respectively, the processor 120 calculates a random vector b using the same. In the sixth step, it has been described that the random vector b is calculated by multiplying a transposed matrix $A^T$, in which a row and a column of the random matrix A are transposed, by the secret key s and adding an error e, but the processor 120 may perform a modular operation on the error e and perform addition. That is, the equation for calculating the error e may be modified as follows.

$$b = -A^T \cdot s + e \bmod q \qquad \text{[Equation 1]}$$

The processor 120 may obtain a random vector (b) based on a value obtained by performing a modular operation having a modulus q with respect to an error e, a secret key, and a random matrix.

The processor 120 may generate the public key including the random matrix A and the random vector b, store the public key in the memory 110 and transmit the same to the external device for performing encryption through the communicator 130.

According to another embodiment, the processor 120 may include a seed capable of generating a random matrix A, that is, a first seed $Seed_A$, in a public key $_{PK}$ together with a random vector b and transmit the same, instead of including the random matrix A directly in the public key and transmitting the same. In this case, the source capacity required for transmission may be saved.

The communicator 130 is configured to communicate with various external devices including the second electronic device 200 of FIG. 1 under the control of the processor 120. The communicator 130 may transmit the public key generated by the processor 120 to the second electronic device 200, and may receive the ciphertext generated by the second electronic device 200.

The communicator 130 may include at least one of a wireless communication module and at least one wired communication module. Each communication module may be implemented as at least one hardware chip. A wireless communication module may include at least one of a Wi-Fi module, a Bluetooth module, an infrared ray communication module, or other communication modules. In addition, the communication module may include at least one chip performing communication according to various communication standards such as Zigbee, $3^{rd}$ generation (3G), $3^{rd}$ generation partnership project (3GPP), long term evolution (LTE), LTE advanced (LTE-A), $4^{th}$ generation (4G), $5^{th}$ generation (5G), or the like. The wired communication module may include, for example, at least one of a local area network (LAN) module, Ethernet module, using a pair cable, a coaxial cable, an optical cable, an ultra-wide band (UWB) module, or the like.

After transmitting the public key, if the ciphertext encrypted with the public key is transmitted from the outside and received through the communicator 130, the processor 120 decrypts the ciphertext stored in the memory 110.

Specifically, the ciphertext received from the external device may include a first value (c1) obtained by rounding a result value of operation based on a random vector r and a random matrix a obtained from the external device, and a second value (c2) obtained by rounding a result value of operation based on the random vector b and the random vector r.

The rounding process refers to processing for sending ciphertext to a smaller modulus area. To be specific, the rounding process of a vector refers to obtaining p/q by a real number operation, and then mapping the closest integer value to each component (real number) of the resulting vector. If p and q are set to a power of 2, a predetermined number of least significant bits in a message may be removed by the rounding process. When the rounding process is performed in this way, it becomes difficult to decrypt even if the third party obtains the ciphertext, and thus the security may be improved.

The processor 120 may perform decryption using the Equation shown below.

$$\mu' = \lfloor t/p \cdot (c_1, s) + t/p' \cdot c_2 \rceil \in \mathcal{R}_t \qquad \text{[Equation 2]}$$

In Equation 2, μ' denotes a decrypted message. Here, t, q, p, p' denote the modulus satisfying the t|p'|p|q relation. That is, the modulus may be an integer value having a relation in which t may divide p', p' may divide p, and p may divide q. In particular, it may be set with two power numbers having such relation. In the case of some components of the ciphertext, it may be restricted to have only a maximum of p' values. In Equation 2, it is described that the rounding function processing is performed and μ' is operated, but according to an implementation example, a modulus operation may be additionally performed after a rounding function processing.

It has been described in detail a method of generating the public key and the secret key, and a decryption method. As described above, a device having the public key may perform encryption using the public key. In the example of FIG. 1, the second electronic device 200 receives the public key generated by the first electronic device 100, and the second electronic device 200 may perform encryption using the received public key. Hereinafter, an encryption method is described using a specific configuration of the second electronic device 200.

Figure 3:
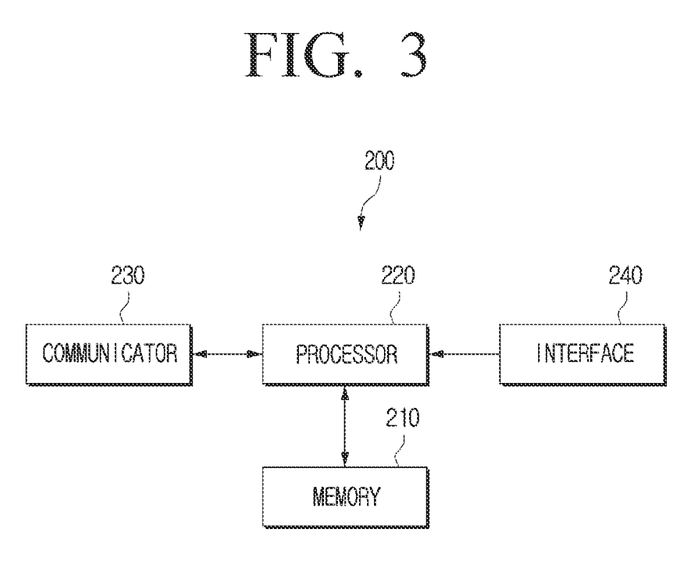
FIG. 3 is a block diagram illustrating a configuration of an electronic device for performing encryption according to at least one embodiment of the disclosure.

FIG. 3 is a block diagram illustrating a configuration of an electronic device for performing encryption. Since the second electronic device described in FIG. 1 may be implemented with the configuration of FIG. 3, for convenience of description, a second electronic device is described as the electronic device 200 in the description of FIG. 3.

The electronic device 200 includes a memory 210, a processor 220, a communicator 230, and an interface 240. Among specific operations and examples of the memory 210, the processor 220, and the communicator 230, parts overlapping with those described in the description of FIG. 2 will be omitted.

The interface 240 is configured to receive data to be transmitted to an external device. Specifically, the interface 240 may include various buttons provided in a main body of the electronic device 200, an operation interface such as a touch screen, or an input/output interface for receiving various external signals. The input/output interface is connected to various external memories or external sources (for example, a web server, a user terminal device, etc.), and various input devices (for example, a keyboard, a mouse, a microphone, a camera, a joystick, etc.) to receive various data. The input/output interface may be implemented with at least one interface among a High Definition Multimedia Interface (HDMI), a Mobile High-Definition Link (MHL), a Universal Serial Bus (USB), a USB C-type, a Display Port (DP), a Thunderbolt, a Video Graphics Array (VGA) port, an RGB port, a D sub-miniature (D-SUB), and a Digital Visual Interface (DVI). At least a part of the interface 240 may be included in the communicator 230. For example, the interface 240 may be implemented as a wired communication interface connected to an external device to perform wired communication.

The processor 220 may input or receive data to be transmitted to an external device through the interface 240 or the communicator 230. The data to be transmitted to the external device may include various information such as a text message, a photograph, voice data, video data, and a program.

The memory 210 is configured to store various data inputted or received through the interface 240 or the communicator 230. The memory 210 may further store various functions, software, data, and the like required for encryption in addition to the data.

The processor 220 may, based on receiving the information about the public key generated by the first electronic device 100 of FIG. 1 through the communicator 230, store the public key in the memory 210.

When there is data to be transmitted to the first electronic device 100, a processor 220 obtains a random vector r that randomly extracts values within a preset range. In addition, the processor 220 obtains a random matrix A and a random vector b from the public key stored in the memory 210.

The processor 220 obtains a first value (c1) obtained by rounding a result value of calculation based on a random matrix A, and a second value (c2) obtained by rounding a result value of operation based on the random vector b, random vector r, and data to be transmitted, respectively. The processor 220 transmits a ciphertext including the obtained first and second values to an external device, that is, the first electronic device 100, through the communicator 230.

The operation of the processor 220 performing encryption by steps is expressed as the equation as shown below.

$$A = \text{expand}A(\text{seed}_A) \quad 1:$$

$$\text{if seed}_r \text{ is not given then seed}_r \leftarrow \{0,1\}^{256} \quad 2:$$

$$r \leftarrow \text{HWT}_{hr}(\text{seed}_r) \in S_n^k \quad 3:$$

$$c_1 = \lfloor p/q \cdot A \cdot r \rceil \in \mathcal{R}_p^k \quad 4:$$

$$c_2 = \lfloor p'/q \cdot (b,r) + p'/t \cdot \mu \rceil \in \mathcal{R}_{p'} \quad 5:$$

$$ct = (c_1, c_2) \quad 6:$$

If a random vector A is included in the public key provided from the first electronic device 100, the processor 220 may omit the first step. On the contrary, if the public key includes a seed $\text{seed}_A$, not the random vector A, the processor 220 may obtain the random matrix A by applying a random matrix sampler function expandA to the seed.

In the third step, the processor 220 may obtain a random vector r by applying a Hamming weight sampler function $\text{HWT}_{hr}$ to the seed $\text{seed}_r$ stored in the memory 210. If the seed $\text{seed}_r$ is not stored in the memory 210, the processor 220 may extract the seed $\text{seed}_r$ from among the data sets consisting of a combination of 0 or 1 by performing the second step.

The processor 220, when a random matrix A and a random vector b, and random vector r are obtained from the public key, obtains first value $c_1$ and a second value $c_2$, respectively, based on the equations of the fourth and fifth steps. In the equations of the fourth and fifth steps, $c_1$ and $c_2$ are finally obtained by rounding function processing, but a modulus operation may be additionally performed after a rounding function processing according to an implementation example. For example, a mod p operation may be additionally performed on $c_1$, and a mod p' operation may be additionally performed on $c_2$. In addition, a modulus operation may be additionally performed according to an implementation in at least some of the other equations described in the disclosure.

In the Equation of the fifth step, μ may be data to be transmitted to the first electronic device 100, that is, a message. The first value $c_1$ may be a vector of the length k, and the second value $c_2$ may be one polynomial.

The processor 220 configures the ciphertext including the first value $c_1$ and the second value $c_2$, and transmits the ciphertext to the external device, for example, the first electronic device 100. As described above, the processor 120 of the first electronic device 100 may decrypt the ciphertext by using the secret key.

Figure 4:
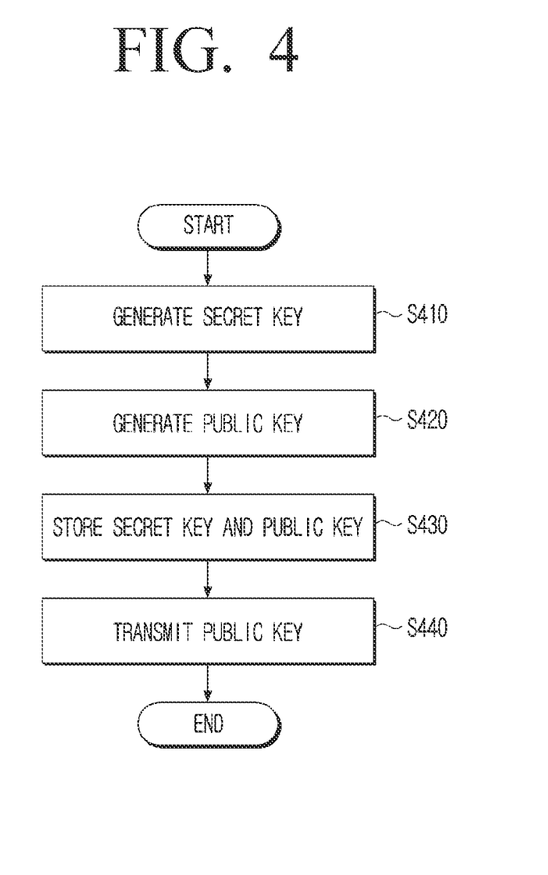
FIG. 4 is a flowchart illustrating a method of generating a public key according to at least one embodiment of the disclosure.

FIG. 4 is a flowchart illustrating a method of generating a public key according to at least one embodiment of the disclosure. Referring to FIG. 4, the electronic device generates a secret key by randomly combining values within a preset range based on the pre-stored data in operation S410. Here, a sum of the number of remaining values other than zero (0), among the values within the preset range, corresponds to a Hamming weight.

The electronic device may generate the public key using the secret key and the error in operation S420.

To be specific, the electronic device may sequentially perform operations of obtaining a random matrix (A) composed of randomly decided vectors, obtaining the error from discrete Gaussian distribution or a distribution within a short statistical distance to the discrete Gaussian distribution, obtaining a random vector (b) based on a value obtained through modular operation of the error, the secret key, and the random matrix, and generating the public key including the random matrix (A), a seed used for obtaining the random matrix (A), and the random vector (b).

The electronic device may store the generated secret key and the public key in operation S430, and may transmit the public key to the external device in operation S440.

The electronic device may, based on receiving, from the external device, a ciphertext encrypted based on the public key, decrypt the ciphertext using the secret key. To be specific, the ciphertext may include a first value (c1) obtained by rounding a result value of operation based on a random vector r that randomly extracts values within a preset range and a random matrix A, and a second value (c2) obtained by rounding a result value of operation based on the random vector b and the random vector r.

The electronic device may decrypt the data by performing modulus operation for each of the first value, the result value of operating of the secret key, and the second value and then performing addition. A specific method of generating the secret key, generating the public key, encrypting, or the like, has been described above and a duplicate description will be omitted.

The control method as illustrated in FIG. 4 may be performed by the first electronic device described in FIGS. 1 and 2, but is not necessarily limited thereto, and may be performed by an electronic device having various configurations.

Figure 5:
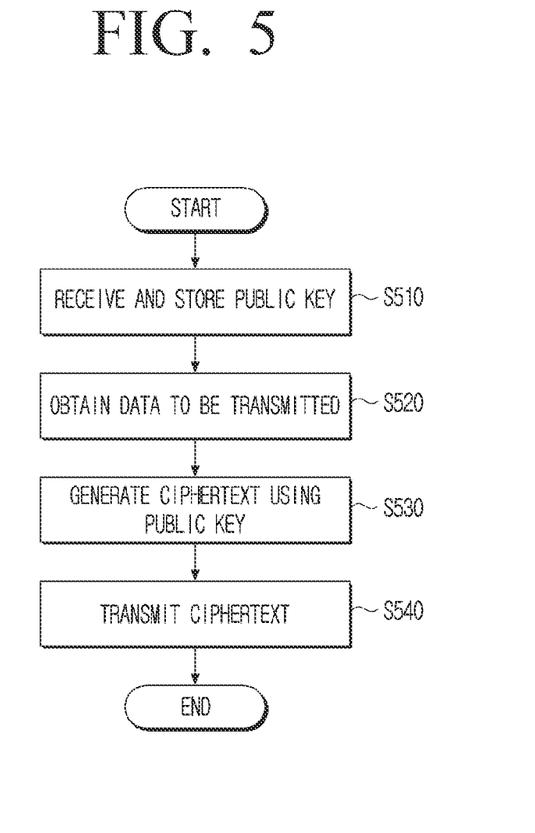
FIG. 5 is a flowchart illustrating a method for performing encryption according to at least one embodiment of the disclosure.

FIG. 5 is a flowchart illustrating a method for performing encryption using the public key generated by the method of FIG. 4.

Referring to FIG. 5, the electronic device, when receiving the public key generated by the external device, stores the public key in operation S510. The public key may be a key generated by the external device using an error.

The electronic device may, based on obtaining data to be transmitted to the external device providing the public key in operation S520, generate a ciphertext by encrypting data using the public key in operation S530. To be specific, the electronic device may sequentially perform operations of obtaining a random vector r that randomly extracts values within a preset range, obtaining a random matrix A and a random vector b from the public key, obtaining a first value (c1) obtained by rounding a result value of operation based on the random matrix A, and a second value (c2) obtained by rounding a result value of operation based on the random vector b, the random vector r, and the data, respectively, and generating a ciphertext including the first value and the second value. When the random matrix A is not included in the ciphertext, the electronic device may directly obtain the random matrix A from the seed included in the ciphertext.

The encryption method of FIG. 5 may be performed by the second electronic device 200 described with reference to FIGS. 1 and 3, but is not limited thereto, and may be performed by an electronic device having a different configuration. A specific encryption formula and algorithm have been described in detail in the above description, and thus a redundant description thereof is omitted.

Figure 6:
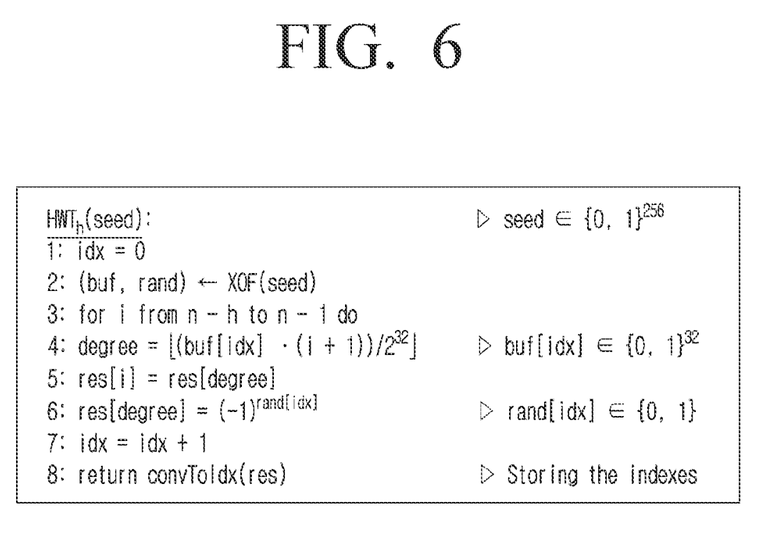
FIG. 6 is a diagram illustrating a method of applying a Hamming weight sampler function.

FIG. 6 illustrates an algorithm of sampling a ternary polynomial vector having a Hamming weight h using the Hamming weight sampler function described in various embodiments above.

The Hamming weight sampler function $HWT_h$ may be an algorithm for selecting a k*256 vector (or k 255-th order polynomials having a coefficient of 1 and −1) where the sum of the number of 1 and −1 is fixed to the Hamming weight h.

Referring to FIG. 6, a process of sampling using the Hamming weight sampler function is summarized as below.

To be specific, 256 bit string seed is extracted, and a buffer value (buf: a value of determining a location (that is, degree) where 1 or −1 is to be located) and a random value (rand: a value of determining 1 or −1) are sampled from the extracted seed.

Next, after sequentially determining a location of the non-zero (that is, 1 or −1) (degree) in total of h, and a value (whether 1 or −1), a location (degree) where 1 or −1 is to be located is determined using a buffer value.

To be specific, if a buffer value buf is an array of the length of 32*h and a buf[idx], which is an idx-th value, is bit strings (0-2^32−1) in the length of 32, a value between 0 and (i+1) may be obtained through a process of multiplying buf[idx] by (i+1) and dividing by 2^32 and rounding down. The value i changes during iteration and a value between 256*k−h and 256*k−1 may be obtained.

In the fifth step, res[i]=res[degree] denotes a process of re-arrangement to avoid overlapping of the selected location, and the sixth step is a process of selecting whether to insert 1 or −1 to the selected location, res[degree].

Then, idx is increased by 1 for the next iteration, and an res array in which a value of a total of h number between 0 to 256*−1 is stored as a result of the iteration is obtained. Finally, index convToIdx (res), i.e., "location" and "value" of 1 and −1, are separately stored to efficiently store the vector. For example, the processors 120, 220 of each device may store in the memory 110, 210 information like "location of the first 1", "location of the second 1", ..., "location of last 1", "indicator of end of 1 and start of −1", "location of first −1", "location of second −1", ..., "location of last −1".

Figure 7:
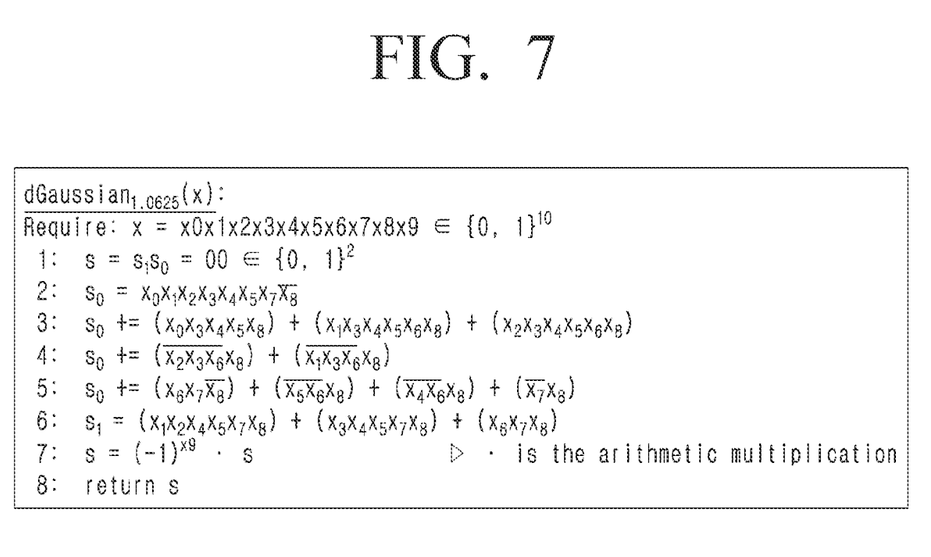
FIGS. 7 and 8 are diagrams illustrating a method for applying a discrete Gaussian sampler function having different standard deviations, and, FIG. 9 is a table for comparing the performance of an encryption method and an existing encryption method according to an embodiment of the disclosure.
Figure 8:
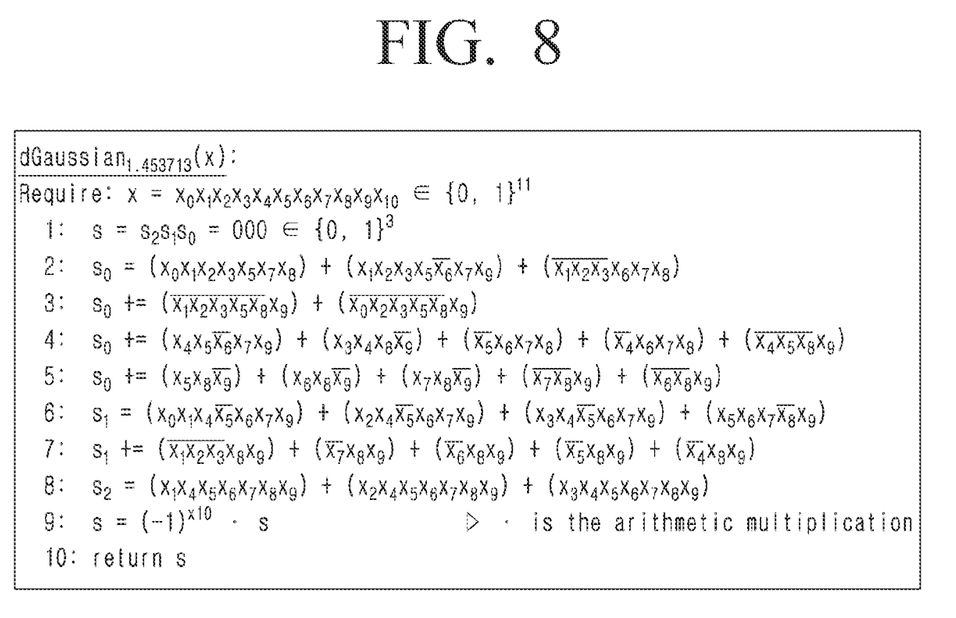

FIGS. 7 and 8 illustrate an algorithm of using a discrete Gaussian sampler function having different standard deviations.

Firstly, FIG. 7 illustrates an operation of the discrete Gaussian sampler where σ=1.0625.

Referring to FIG. 7, the discrete Gaussian sampler receives (random) bit string (x=x0x1x2x3x4x5x6x7x8x9) in the length of 10.

As the first step, in the discrete Gaussian sampler, the output value s (the discrete Gaussian sample finally obtained) is initialized ($s=s_1s_0=00$).

In the second and third steps, the discrete Gaussian sampler performs a process of adding all of multiplication of the first bit of s by the zeroth, first, second, third, fourth, fifth, and seventh random bit string, and a flip of an eighth random bit string (that is, 1-x8. 1->0, 0->1), multiplication of the zeroth, third, fourth, fifth, sixth, and eighth random bit strings, multiplication of the first, the third, the fourth, the fifth, the sixth, and the eighth random bit string, and multiplication of the second, third, fourth, fifth, sixth, and eighth random bit string.

Next, In the fourth step, the first bit of s is added with multiplication of the flips of the second, third, sixth random bit strings by the eighth bit string and the multiplication of the flips of the first, third, and sixth random bit strings by the eighth bit string.

Next, in the fifth step, it is performed a process of adding all of the multiplication of the first bit of s by the sixth and seventh random bit string and a flip of the eighth random bit string, multiplication of the flips of the fifth and sixth random bit strings by the eighth bit string, and multiplication of the flip of the seventh random bit string and the eighth bit string.

The sixth step indicates a process of setting the second bit of s.

In the seventh step, a sign (plus or minus) is assigned to bit string s=(s0, s1) in the length of 2. Through this process, s may be finally the discrete Gaussian sample having σ (standard deviation)=1.0625.

FIG. 8 illustrates an operation of the discrete Gaussian sampler where σ=1.453713.

Referring to FIG. 8, the discrete Gaussian sampler initializes output s by receiving the random bit string (x=x0x1x2x3x4x5x6x7x8x9x10) in the length of 11.

Next, the first bit ($s_0$), second bit ($s_1$), and third bit ($s_2$) of s are sequentially obtained. Finally, by assigning a sign (plus or minus) to bit string s=(s0, s1, s2) in the length of 3, the discrete Gaussian sample s where σ=1.453713 may be obtained.

In FIGS. 7 and 8, the operation of the discrete Gaussian sampler having an arbitrary standard deviation is described, but the embodiment is not limited thereto and the value of standard deviation, operation order of the sampler, operation formula, or the like, may be modified in a diverse manner. The discrete Gaussian sampler of FIGS. 7 and 8 may be executed by the processors 120, 130 of each device 100, 200.

Hereinabove, the public key encryption algorithm has been described in detail, but according to still another embodiment of the disclosure, a symmetric key may be generated using the public key and the secret key generated in the aforementioned method and a symmetric key algorithm may be implemented by sharing the symmetric key with another electronic device.

To be specific, the first electronic device 100 may generate the same new key K that may be shared with the second electronic device 200. The new key K may be referred to as a session key.

For example, the processor 120 of the first electronic device 100 may generate a key by sequentially performing the step as shown below.

$(pk, sk') \leftarrow \text{KeyGen}(1^\lambda)$  1:

$d \leftarrow \{0,1\}^{256}$  2:

return $pk, sk(sk', d)$  3:

Here, the pk may be the public key pk=(seed$_A$, b) or (A, b) described in the aforementioned embodiment.

The first step is a step in which the processor 120 receives a security parameter and generates a portion of the public key (pk) and the secret key (sk'). The second step is a step in which, when the entire protocol fails, a random value (d, 256 bit string) for generating a replacement key to be used in place of the key is selected. In the third step, the processor 120 generates the secret key (sk) by combining the random value (d) and a portion (sk') of the secret key. Here, the secret key is sk=(sk', d), and sk' corresponds to a portion of sk. The first electronic device 100 transmits the generated public key pk to the second electronic device 200.

The processor 220 of the second electronic device 200 performs encapsulation. A specific step of the encapsulation may be implemented as shown below.

$\mu \leftarrow \{\mu 0,1\}^{256}$  1:

$(K, \text{seed}) \leftarrow G(\mu, H(pk))$  2:

$ct \leftarrow \text{Enc}(pk, \mu; \text{seed})$  3:

return $ct, K$  4:

Here, the first step is a step of extracting a random value μ (256 bit string) for generating a key (K) for sharing. The second step is a step of generating a seed (seed, 256 bit string) for generation of the ciphertext and the sharing key (K) by applying hash functions G, H to the random value μ and the public key extracted in the first step. The third step is a step of making the ciphertext ct using the public key, the random value μ extracted in the first step, and the seed generated in the second step. The hash function H is a hash function for hashing the public key, and the hash function G is a hash function for obtaining the sharing key K seed and a seed.

In the embodiment, instead of using a message to be actually transmitted, a random μ is selected to make the key K, and the random μ is used like a message of the aforementioned other embodiment, and the ciphertext is generated.

The second electronic device 200 may transmit the generated ciphertext to the first electronic device 100. The first electronic device 100 may, based on receiving the ciphertext, perform the decapsulation.

A specific decapsulation may be implemented as shown below.

$\mu' = \text{Dec}(sk', ct)$  1:

$(K', \text{seed}) \leftarrow G(\mu', H(pk))$  2:

$ct' \leftarrow \text{Enc}(pk, \mu'; \text{seed}')$  3:

$(\hat{K}, \cdot) \leftarrow G(d, H(ct))$  4:

if $ct \neq ct'$ then  5:

$K' \leftarrow \hat{K}$  6:

return $K'$  7:

Here, the first step denotes a process of decrypting ciphertext (ct') using a portion (sk') of the secret key. The second step denotes a process in which the hash function G, H is applied to the decrypted value (μ') and the public key, and a seed (256 bit string) used for generation of the ciphertext and the shared key (K') are restored. The third step denotes a process of regenerating (ct') the ciphertext using the decrypted value (μ'), the restored seed, and the public key.

The fourth step denotes a process of generating alternative key $\hat{K}$ in preparation for a case in which the received ciphertext is different from the regenerated ciphertext. The fifth step is a process of identifying whether the regenerated ciphertext (ct') is the same as the received ciphertext (ct), and the sixth step denotes to a process of replacing the sharing key K' with an alternative key $\hat{K}$ if the ciphertexts are not the same.

Figure 9:
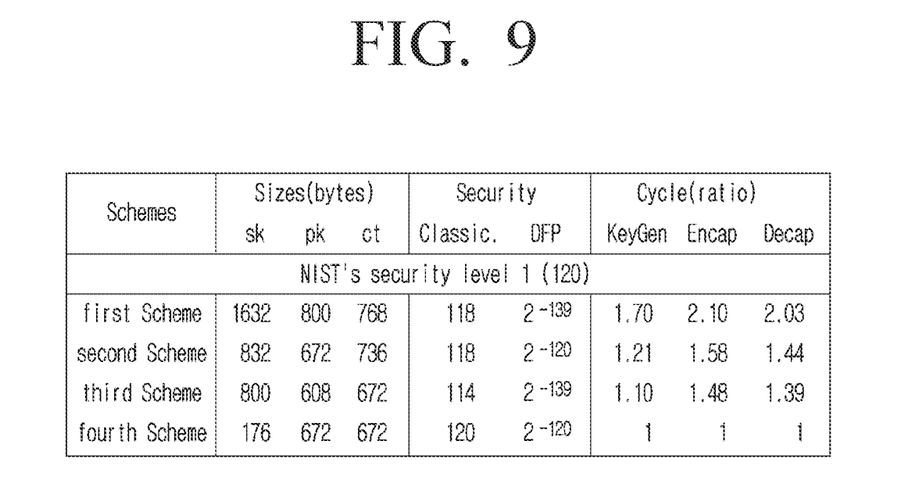

FIG. 9 is an experiment data for describing efficiency of encryption performed in the aforementioned method.

FIG. 9 illustrates sizes (bytes) of the secret key (sk), public key (pk), ciphertext (ct) of the related-art encryption schemes (first to third schemes) and the encryption scheme (a fourth scheme) of the disclosure, security, and the number of operation cycles for performing encryption.

According to FIG. 9, it can be seen that the security score in the fourth scheme is 120, and has security almost equivalent to national institute of standards and technology (NIST) security level 1. In contrast, the size of the secret key is remarkably reduced, and the number of operation cycles in the key generation (KeyGen), the encapsulation (Encap), and the decapsulation (Decap) is smaller than the other schemes. That is, referring to FIG. 9, it can be seen that the encryption mechanism of the disclosure significantly improves efficiency while maintaining security compared to other existing encryption mechanisms.

Hereinabove, it has been described that generation of the public key and encryption are performed by different devices, but generation of the public key, encryption, and decryption may be performed in one device.

The above-described various embodiments have been described above, but the embodiments are not necessarily implemented only individually, and may be combined in whole or in part with at least one other embodiment to be implemented together in one product.

Various embodiments of the disclosure may be implemented in software, including instructions stored on machine-readable storage media readable by a machine (e.g., a computer). A device may call instructions from the storage medium, and execute the called instruction, including the electronic devices 100, 200 according to the disclosed embodiments.

Specifically, a non-transitory readable storage medium storing software for sequentially performing the operations of generating a secret key by randomly combining values within a preset range based on the pre-stored data; generating a public key by using the secret key and the error;

storing the secret key and the public key; and transmitting the public key to an external device may be provided.

Alternatively, a non-transitory readable storage medium storing software for sequentially performing the operations of obtaining a random vector r randomly extracting values within a preset range, obtaining a random matrix A and a random vector b from the public key, obtaining a first value (c1) obtained by rounding a result value calculated based on the random matrix A and a second value (c2) obtained by rounding a result value operated based on the random vector b, the random vector r, and the data, and generating a ciphertext including the first value and the second value may be provided.

The device in which the non-transitory readable storage medium is provided may perform operations such as generating the public key, encryption, decryption, or the like, described in the aforementioned various embodiments.

In the non-transitory readable storage medium, the term "non-transitory" only denotes that a storage medium does not include a signal but is tangible, and does not distinguish the case in which a data is semi-permanently stored in a storage medium from the case in which a data is temporarily stored in a storage medium.

A program for performing a method according to the aforementioned various embodiments may be distributed online through an application store. In the case of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some sub-elements of the abovementioned sub-elements may be omitted. The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, or other operations may be added.

Although the description of the disclosure is made with reference to the accompanying drawings, the scope of the rights is defined by the appended claims and is not construed as being limited to the described embodiments and/or the drawings. In addition, it should be understood that the disclosure includes various improvements, modifications and changes of the embodiments of the claims which are obvious to those skilled in the art are included in the scope of rights of the disclosure.

What is claimed is:

1. An electronic device comprising:
a communicator;
a memory configured to store data for generating a key; and
a processor,
wherein the processor is configured to:
generate a secret key by randomly combining values within a preset range based on the data stored in the memory, generate a public key using the secret key and an error, and store the secret key and the public key in the memory,
transmit the public key to an external device using the communicator, and
wherein a sum of the number of remaining values other than zero (0), among the values within the preset range, corresponds to a Hamming weight.

2. The electronic device of claim 1, wherein the processor is configured to:
obtain a random matrix (A) composed of randomly decided vectors,
obtain the error from discrete Gaussian distribution or a distribution within a short statistical distance to the discrete Gaussian distribution,
obtain a random vector (b) based on a value obtained through modular operation of the error, the secret key, and the random matrix,
wherein the public key comprises the random matrix (A), a seed used for obtaining the random matrix (A), and the random vector (b).

3. The electronic device of claim 2, wherein the processor is configured to:
obtain a first seed, a second seed, and a third seed by applying an extendable-output function (XOF) for the seed, among the data stored in the memory,
obtain the random matrix (A) by applying a random matrix sampler function to the first seed,
obtain the secret key s, which is a sparse vector having a Hamming weight h, by applying the Hamming weight sampler function to the second seed, and
obtain an error e having standard deviation $\sigma$ by applying a discrete Gaussian sampler function to the third seed.

4. The electronic device of claim 3, wherein, based on receiving, from the external device through the communicator, a ciphertext comprising a first value (c1) obtained by rounding a result value of operation based on a random vector r that randomly extracts values within a preset range and a random matrix A, and a second value (c2) obtained by rounding a result value of operation based on the random vector b and the random vector r,
the processor decrypts a message by, after performing modulus operation for each of the first value, the result value of operating of the secret key, and the second value, performing addition.

5. An electronic device comprising:
a communicator;
an interface configured to receive data to be transmitted to an external device;
a memory configured to store the data; and
a processor,
wherein the processor is configured to, based on receiving information about a public key generated by an external device using an error through the communicator:
obtain a random vector r that randomly extracts values within a preset range,
obtain a random matrix A and a random vector b from the public key,
obtain a first value (c1) obtained by rounding a result value of operation based on the random matrix A, and a second value (c2) obtained by rounding a result value of operation based on the random vector b, the random vector r, and the data, respectively, and
transmit a ciphertext comprising the first value and the second value to the external device through the communicator.

6. The electronic device of claim 5, wherein the processor is configured to:
based on the public key comprising the random matrix A, extract the random matrix A, and based on the public key comprising a seed, obtain the random matrix (A) by applying a random matrix sampler function to the seed.

7. The electronic device of claim 6, wherein the processor is configured to obtain the random vector r by applying a Hamming weight sampler function to the seed stored in the memory.

8. A control method of an electronic device, the method comprising:
   generating a secret key by randomly combining values within a preset range based on pre-stored data;
   generating a public key using the secret key and an error;
   storing the secret key and the public key; and
   transmitting the public key to an external device,
   wherein a sum of the number of remaining values other than zero (0), among the values within the preset range, corresponds to a Hamming weight.

9. The method of claim 8, wherein the generating the public key comprises:
   obtaining a random matrix (A) composed of randomly decided vectors;
   obtaining the error from discrete Gaussian distribution or a distribution within a short statistical distance to the discrete Gaussian distribution;
   obtaining a random vector (b) based on a value obtained through modular operation of the error, the secret key, and the random matrix; and
   generating the public key comprising the random matrix (A), a seed used for obtaining the random matrix (A), and the random vector (b).

10. The method of claim 9, wherein the generating the public key comprises:
    obtaining a first seed, a second seed, and a third seed by applying an extendable-output function (XOF) for the pre-stored seed;
    obtaining the random matrix (A) by applying a random matrix sampler function to the first seed;
    obtaining an error e having standard deviation o by applying a discrete Gaussian sampler function to the third seed,
    wherein the generating the secret key comprises obtaining the secret key s, which is a sparse vector having a Hamming weight h, by applying the Hamming weight sampler function to the second seed.

11. The method of claim 10, further comprising:
    based on receiving, from the external device, a ciphertext comprising a first value (c1) obtained by rounding a result value of operation based on a random vector r that randomly extracts values within a preset range and a random matrix A, and a second value (c2) obtained by rounding a result value of operation based on the random vector b and the random vector r, decrypting a message by, after performing modulus operation for each of the first value, the result value of operating of the secret key, and the second value, performing addition.

12. An encryption method of an electronic device, the method comprising:
    receiving information about a public key generated by an external device using an error and storing the information;
    obtaining a random vector r that randomly extracts values within a preset range;
    obtaining a random matrix A and a random vector b from the public key;
    obtaining a first value (c1) obtained by rounding a result value of operation based on the random matrix A, and a second value (c2) obtained by rounding a result value of operation based on the random vector b, the random vector r, and the data, respectively; and
    transmitting a ciphertext comprising the first value and the second value to the external device.

13. The method of claim 12, wherein the obtaining a random matrix A and a random vector b from the public key comprises:
    based on the public key comprising the random matrix A, extracting the random matrix A; and
    based on the public key comprising a seed, obtaining the random matrix (A) by applying a random matrix sampler function to the seed.

14. The method of claim 13, wherein the obtaining the random vector r comprises obtaining the random vector r by applying a Hamming weight sampler function to the pre-stored seed.

* * * * *